(12) United States Patent
Moteki et al.

(10) Patent No.: US 8,889,577 B2
(45) Date of Patent: Nov. 18, 2014

(54) SINTERED BODY AND CUTTING TOOL

(75) Inventors: Jun Moteki, Inuyama (JP); Yusuke Katsu, Komaki (JP); Kuniharu Tanaka, Komaki (JP); Takeshi Mitsuoka, Konan (JP); Yoshihiro Kuroki, Komaki (JP); Hironobu Kusanagi, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 49 days.

(21) Appl. No.: 13/879,724

(22) PCT Filed: Jul. 6, 2012

(86) PCT No.: PCT/JP2012/004403
§ 371 (c)(1),
(2), (4) Date: Apr. 16, 2013

(87) PCT Pub. No.: WO2013/011650
PCT Pub. Date: Jan. 24, 2013

(65) Prior Publication Data
US 2013/0236259 A1   Sep. 12, 2013

(30) Foreign Application Priority Data
Jul. 19, 2011   (JP) ................... 2011-157624

(51) Int. Cl.
*C04B 35/119* (2006.01)
*B23B 27/14* (2006.01)
*C04B 35/626* (2006.01)
*C04B 35/645* (2006.01)
*C04B 35/488* (2006.01)

(52) U.S. Cl.
CPC ......... *B23B 27/148* (2013.01); *C04B 35/62695* (2013.01); *C04B 35/119* (2013.01); *C04B 35/6455* (2013.01); *C04B 2235/3262* (2013.01); *C04B 2235/765* (2013.01); *C04B 2235/3225* (2013.01); *C04B 2235/96* (2013.01); *C04B 2235/3208* (2013.01); *C04B 2235/72* (2013.01); *C04B 35/4885* (2013.01); *C04B 2235/3418* (2013.01); *C04B 2235/785* (2013.01); *C04B 2235/85* (2013.01)
USPC .......................................... 501/105; 407/119

(58) Field of Classification Search
CPC .............. C04B 35/119; C04B 35/6455; C04B 2235/96; C04B 2235/3246; B23B 27/148
USPC .......................................... 501/105; 407/119
See application file for complete search history.

(56) References Cited

U.S. PATENT DOCUMENTS

| 7,148,167 B2 * | 12/2006 | Shikata et al. | 501/105 |
| 7,928,028 B2 * | 4/2011 | Nawa et al. | 501/105 |
| 8,093,168 B2 * | 1/2012 | Nawa et al. | 501/105 |

FOREIGN PATENT DOCUMENTS

JP       2-055261 A     2/1990

(Continued)

OTHER PUBLICATIONS

Wang Jing et al.; "Preparation of Nano-powder of Zirconia Toughened Alumina and Study on Properties Thereof"; 1994-2009 China Academic Journal Electronic Publishing House; www.cnki.net; pp. 38-42.

(Continued)

*Primary Examiner* — Karl Group
(74) *Attorney, Agent, or Firm* — Sughrue Mion, PLLC (57) ABSTRACT

A sintered body containing alumina crystal particles and zirconia crystal particles as main components includes the tetragonal crystal particles as the zirconia crystal particles. The zirconia crystal particles satisfy relations $0\% \leq A \leq 3\%$, $3\% \leq B \leq 22\%$ and $77\% \leq C \leq 96\%$, where A, B and C are as defined herein.

6 Claims, 10 Drawing Sheets

(56) References Cited

FOREIGN PATENT DOCUMENTS

| JP | 10-194824 A | 7/1998 |
| JP | 2000-319064 A | 11/2000 |
| JP | 2000-344569 A | 12/2000 |
| JP | 2010-037146 A | 2/2010 |

OTHER PUBLICATIONS

Internation Search Report for PCT/JP2012/004403 dated Jul. 31, 2012.

* cited by examiner

| SAMPLES | ZIRCONIA TYPE PERCENTAGES | | | NUMBER OF CRYSTAL PARTICLES IN 10 μm SQUARE AREA | | | AVERAGE INTERFACE LENGTH IL | CRYSTALLINE PHASE ZIRCONIA | ALUMINA/ZIRCONIA COMPOSITION RATIO | | STABILIZER FOR ZIRCONIA $Y_2O_3$ | INEVITABLE IMPURITY $SiO_2$ |
|---|---|---|---|---|---|---|---|---|---|---|---|---|
| | A % | B % | C % | ZIRCONIA NUMBER | ALUMINA NUMBER | TOTAL NUMBER | μm | — | ALUMINA CONTENT vol% | ZIRCONIA CONTENT vol% | mol% | wt% |
| EX 1 | 1.5 | 21.1 | 77.4 | 159 | 124 | 283 | 185 | T | 80 | 20 | 2.6 | 0.09 |
| EX 2 | 1.1 | 16.5 | 82.4 | 360 | 274 | 634 | 368 | T | 70 | 30 | 2.0 | 0.09 |
| EX 3 | 0.0 | 13.2 | 86.8 | 280 | 220 | 500 | 429 | T | 70 | 30 | 2.0 | 0.12 |
| EX 4 | 1.1 | 12.3 | 86.6 | 148 | 118 | 266 | 202 | T | 70 | 30 | 2.0 | 0.21 |
| EX 5 | 0.8 | 11.6 | 87.6 | 214 | 156 | 370 | 250 | T | 70 | 30 | 2.0 | 0.12 |
| EX 6 | 0.0 | 10.4 | 89.6 | 182 | 173 | 355 | 265 | T | 70 | 30 | 2.0 | 0.23 |
| EX 7 | 0.6 | 8.4 | 91.0 | 153 | 120 | 273 | 197 | T | 70 | 30 | 2.0 | 0.24 |
| EX 8 | 0.8 | 7.9 | 91.3 | 215 | 149 | 364 | 226 | T | 70 | 30 | 2.6 | 0.13 |
| EX 9 | 2.5 | 6.1 | 91.4 | 204 | 139 | 343 | 241 | T | 70 | 30 | 2.6 | 0.18 |
| EX 10 | 1.3 | 3.0 | 95.7 | 235 | 166 | 401 | 221 | T | 60 | 40 | 2.6 | 0.11 |
| EX 11 | 1.1 | 5.5 | 93.4 | 142 | 113 | 255 | 132 | T | 50 | 50 | 2.0 | 0.18 |
| COMP EX 12 | 3.8 | 11.0 | 85.2 | 351 | 272 | 623 | 203 | T | 70 | 30 | 2.0 | 0.09 |
| COMP EX 13 | 0.0 | 27.3 | 72.7 | 145 | 125 | 270 | 186 | T | 85 | 15 | 2.0 | 0.11 |
| COMP EX 14 | 0.8 | 7.5 | 91.7 | 133 | 102 | 235 | 189 | T | 70 | 30 | 2.0 | 0.13 |
| COMP EX 15 | 0.0 | 76.1 | 23.9 | 74 | 94 | 165 | 74 | M, T | 94 | 6 | 0.0 | 0.06 |
| COMP EX 16 | 10.7 | 0.0 | 89.3 | 299 | 99 | 398 | 64 | T | 30 | 70 | 2.0 | 0.08 |
| COMP EX 17 | 0.0 | 17.2 | 82.8 | 43 | 32 | 75 | 119 | T | 70 | 30 | 2.0 | 0.10 |

Fig.7

| SAMPLES | BENDING STRENGTH SPAN 10mm MPa | FRACTURE TOUGHNESS Kc MPa·m^0.5 | HARDNESS VICKERS Hv | WEAR RESISTANCE TEST WIDTH OF FLANK WEAR mm | FRACTURE RESISTANCE TEST FEED RATE | | | | | | | EVALUATION OF CUTTING PERFORMANCE WEAR WIDTH<0.10 FRACTURE RESISTANCE>0.6 |
|---|---|---|---|---|---|---|---|---|---|---|---|---|
| | | | | | 0.50 mm/rev. | 0.55 mm/rev. | 0.60 mm/rev. | 0.65 mm/rev. | 0.70 mm/rev. | 0.75 mm/rev. | | |
| EX 1 | 1790 | 3.5 | 1810 | 0.08 | ○ | ○ | ○ | ○ | × | | | ○ |
| EX 2 | 1950 | 3.8 | 1780 | 0.05 | ○ | ○ | ○ | ○ | ○ | ○ | | ◎ |
| EX 3 | 2170 | 4.5 | 1710 | 0.06 | ○ | ○ | ○ | ○ | ○ | ○ | | ◎ |
| EX 4 | 1650 | 4.6 | 1660 | 0.07 | ○ | ○ | ○ | ○ | ○ | × | | ◎ |
| EX 5 | 2170 | 4.5 | 1710 | 0.06 | ○ | ○ | ○ | ○ | ○ | ○ | | ◎ |
| EX 6 | 1650 | 4.6 | 1710 | 0.08 | ○ | ○ | ○ | ○ | ○ | | | ○ |
| EX 7 | 1940 | 4.8 | 1680 | 0.09 | ○ | ○ | ○ | ○ | × | | | ○ |
| EX 8 | 2100 | 4.0 | 1730 | 0.07 | ○ | ○ | × | × | × | | | ○ |
| EX 9 | 2060 | 3.9 | 1770 | 0.08 | ○ | ○ | × | × | × | | | ○ |
| EX 10 | 2090 | 5.0 | 1690 | 0.07 | ○ | ○ | ○ | × | | | | ○ |
| EX 11 | 1760 | 5.7 | 1520 | 0.09 | ○ | ○ | ○ | × | | | | △ |
| COMP EX 12 | 1530 | 3.7 | 1750 | 0.15 | ○ | ○ | | | | | | × |
| COMP EX 13 | 980 | 3.5 | 1860 | 0.18 | ○ | ○ | | | | | | × |
| COMP EX 14 | 1450 | 4.6 | 1710 | 0.22 | ○ | ○ | | | | | | × |
| COMP EX 15 | 790 | 3.3 | 1890 | 0.26 | × | | | | | | | × |
| COMP EX 16 | 1440 | 6.3 | 1470 | 0.36 | ○ | × | | | | | | × |
| COMP EX 17 | 1720 | 3.9 | 1690 | 0.13 | ○ | × | | | | | | × |

Fig.8

WET MILLING TEST

| SAMPLES | NUMBER OF IMPACTS | | | | | |
|---|---|---|---|---|---|---|
| | 600 TIMES OR LESS | 1200 | 1800 | 2400 | 3000 | 3600 |
| COMP EX 12 | DEFECT | – | – | – | – | – |
| COMP EX 14 | DEFECT | – | – | – | – | – |
| EX 3 | NO DEFECT | NO DEFECT | NO DEFECT | NO DEFECT | NO DEFECT | NO DEFECT |
| COMP EX 18 (TiC-ALUMINA) | NO DEFECT | NO DEFECT | NO DEFECT | NO DEFECT | NO DEFECT | NO DEFECT |

Fig.9

DRY MILLING TEST OF ALLOY STEEL

<MAXIMUM WIDTH (mm) FLANK WEAR AFTER 3 PASSES>

| SAMPLES | CUTTING SPEED (m/min.) | | | |
|---|---|---|---|---|
| | 200 | 400 | 800 | 1500 |
| EX 3 | 0.04 | 0.03 | 0.03 | 0.04 |
| COMP EX 15 | DEFECT | DEFECT | CHIPPING | DEFECT |
| COMP EX 19 (ALUMINA-ZIRCONIA) | DEFECT | DEFECT | DEFECT | DEFECT |
| COMP EX 20 (PVD-COATED CEMENTED CARBIDE) | 0.02 | 0.02 | CHIPPING | – |

Fig.10

TURNING OF DUCTILE CAST IRON

<WIDTH OF FLANK WEAR (mm) AFTER 6 PASSES>

| SAMPLES | WEAR WIDTH | STATUS |
|---|---|---|
| EX 3 | 0.21 | NORMAL WEAR |
| COMP EX 15 | – | OCCURRENCE OF DEFECT BY 1 PASS, NOT CONTINUABLE |
| COMP EX 19 (ALUMINA-ZIRCONIA) | – | OCCURRENCE OF DEFECT BY 1 PASS, NOT CONTINUABLE |
| COMP EX 21 (TiC-ALUMINA) | 0.30 | OCCURRENCE OF CHIPPING BY 2 PASSES, NOT CONTINUABLE |

Fig. 11

| SAMPLES | ZIRCONIA TYPE PERCENTAGES | | | NUMBER OF CRYSTAL PARTICLES IN 10 μm SQUARE AREA | | | | AVERAGE INTERFACE LENGTH IL | $SiO_2$ | OCCURRENCE OF FRACTURE/ CHIPPING |
|---|---|---|---|---|---|---|---|---|---|---|
| | A | B | C | ZIRCONIA | ALUMINA | TOTAL | | | | |
| | % | % | % | NUMBER | NUMBER | NUMBER | | μm | wt% | |
| EX 12 | 0.0 | 10.0 | 90.0 | 246 | 183 | 429 | | 296 | 0.06 | NONE |
| EX 5 | 0.8 | 11.6 | 87.6 | 214 | 156 | 370 | | 250 | 0.12 | NONE |
| EX 13 | 0.0 | 10.5 | 89.5 | 237 | 176 | 413 | | 273 | 0.15 | NONE |
| EX 7 | 0.6 | 8.4 | 91.0 | 153 | 120 | 273 | | 197 | 0.24 | CHIPPING |
| COMP EX 22 | 0.7 | 9.5 | 89.8 | 141 | 123 | 264 | | 203 | 0.30 | FRACTURE |

Fig.12

| SAMPLES | ZIRCONIA TYPE PERCENTAGES | | | NUMBER OF CRYSTAL PARTICLES IN 10 μm SQUARE AREA | | | AVERAGE INTERFACE LENGTH IL | SiO₂ | OCCURRENCE OF FRACTURE/ CHIPPING |
|---|---|---|---|---|---|---|---|---|---|
| | A | B | C | ZIRCONIA | ALUMINA | TOTAL | | | |
| | % | % | % | NUMBER | NUMBER | NUMBER | μm | wt% | |
| EX 3 | 0.0 | 13.2 | 86.8 | 280 | 220 | 500 | 429 | 0.12 | NONE |
| EX 4 | 1.1 | 12.3 | 86.6 | 148 | 118 | 266 | 202 | 0.21 | NONE |
| EX 14 | 0.0 | 11.0 | 89.0 | 167 | 108 | 275 | 195 | 0.06 | CHIPPING |
| COMP EX 23 | 0.0 | 9.8 | 90.2 | 108 | 72 | 180 | 176 | 0.08 | FRACTURE |
| COMP EX 24 | 0.0 | 8.8 | 91.2 | 110 | 77 | 187 | 155 | 0.07 | FRACTURE |

SINTERED BODY AND CUTTING TOOL

CROSS-REFERENCE TO RELATED APPLICATIONS

This application is a 371 of PCT/JP2012/004403 filed Jul. 6, 2012, which claims priority to Japanese Patent Application No. 2011-157624 filed on Jul. 19, 2011, the above-noted applications hereby incorporated by reference in their entirety.

TECHNICAL FIELD

The present invention relates to a sintered body of an alumina-zirconia ceramic.

BACKGROUND ART

Alumina-zirconia ceramics are the material of excellent chemical stability and wear resistance and are used as various structural members and cutting tool materials. The performances of these alumina-zirconia ceramics significantly depend on the crystalline phase, the particle size and the aggregation/dispersion state of zirconia and have accordingly been studied in various ways (see, e.g., PTL 1 to 4).

The conventional alumina-zirconia ceramics, however, have the insufficient texture control of zirconia crystal particles and alumina crystal particles. Application of the conventional alumina-zirconia ceramics to cutting tools accordingly causes insufficient fracture resistance in working at a high feed rate. The conventional alumina-zirconia ceramics may also have wear caused by a small fracture and have insufficient wear resistance. The cutting tools using such alumina-zirconia ceramics are thus used only for processing at a low feed rate (e.g., finishing processing).

CITATION LIST

Patent Literatures

PTL1: JP 2000-319064A
PTL2: JP 2000-344569A
PTL3: JP H10-194824A
PTL4: JP H02-055261A

SUMMARY

Technical Problem

By taking into account at least part of the foregoing, the object of the invention is to improve the wear resistance or the fracture resistance of an alumina-zirconia ceramic.

Solution to Problem

In order to solve at least part of the foregoing, the invention provides any of the following aspects or embodiments.

[Aspect 1] A sintered body containing alumina crystal particles and zirconia crystal particles as main components is provided. In the sintered body, the zirconia crystal particles include tetragonal crystal particles and satisfy relations $0\% \leq A \leq 3\%$, $3\% \leq B \leq 22\%$ and $77\% \leq C \leq 96\%$. A represents a ratio of a number a of first zirconia crystal particles to the total number N of the zirconia crystal particles, wherein each of the first zirconia crystal particles is surrounded by only the zirconia crystal particles. B represents a ratio of a number b of second zirconia crystal particles to the total number N of the zirconia crystal particles, wherein each of the second zirconia crystal particles is surrounded by only the alumina crystal particles. C represents a ratio of a number c of third zirconia crystal particles to the total number N of the zirconia crystal particles, wherein each of the third zirconia crystal particles is surrounded by both the zirconia crystal particle and the alumina crystal particle. N represents a total number of the zirconia crystal particles in a 10 μm square area at any cut plane of the sintered body. The number N is equal to or greater than a value 140.

In the sintered body of this aspect, the sizes of the zirconia crystal particles and the alumina crystal particles are reduced, and the ratio of the alumina crystal particles surrounding a zirconia crystal particle is adequately controlled. This aspect also allows control to prevent the zirconia crystal particles from being excessively concentrated and being unevenly distributed. As a result, this achieves the effect of stress-induced transformation and the grain growth-inhibiting effect suitable for the cutting tool. Using this sintered body for a cutting tool improves the wear resistance and the fracture resistance of the cutting tool.

[Aspect 2] The sintered body according to aspect 1, wherein an average total length of interfaces between the zirconia crystal particles and the alumina crystal particles is equal to or greater than 180 μm in a 10 μm square area at each of any five or more cut planes of the sintered body.

The sintered body of this aspect allows more preferable control to reduce the size of the zirconia crystal particles and the size of the alumina crystal particles surrounding a zirconia crystal particle and to prevent the respective crystal particles from being excessively concentrated and being unevenly distributed. This further improves the effects of the first aspect.

[Aspect 3] The sintered body according to either one of aspect 1 and 2, wherein a content of $SiO_2$ contained in the sintered body is equal to or less than 0.24 wt %. The sintered body of this aspect has the relatively small content of $SiO_2$, thereby effectively preventing the occurrence of chipping or fracture in application for a cutting tool.

The invention may also be actualized as a cutting tool according to any of aspect 4 to 6.

[Aspect 4] A cutting tool using the sintered body of any one of the aspect 1 to 3.

[Aspect 5] A cutting tool according to aspect 4 that may be used to process steel.

[Aspect 6] A cutting tool according to aspect 4 that may be used to process ductile cast iron.

DESCRIPTION OF THE PREFERRED EMBODIMENTS

A-1. Features of Sintered Body SC

Figure 1:
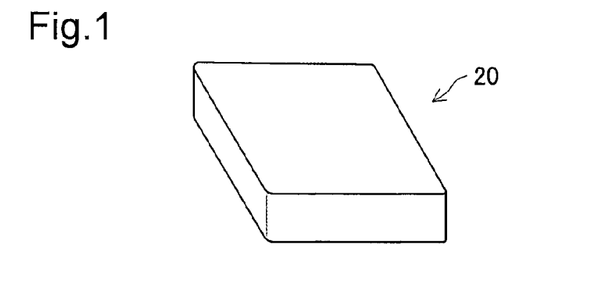
FIG. 1 illustrates the appearance of a tip 20.

One embodiment of the invention is described. FIG. 1 illustrates the appearance of a tip 20 for a cutting tool manufactured using a sintered body SC as the material according to one embodiment of the sintered body of the invention. The tip 20 is a throw-away tip or cutting insert. This tip 20 is detachably attached to the main body of a cutting tool. As illustrated in FIG. 1, the tip 20 has a substantially rectangular parallelepiped shape. The illustrated shape of the tip 20 corresponds to the shape of SNGN433-TN specified by the ISO standards. The shape of the tip 20 may, however, be set arbitrarily.

The sintered body SC as the material of the tip 20 is made of an alumina-zirconia ceramic containing alumina ($Al_2O_3$) and zirconia ($ZrO_2$) as main components. According to this embodiment, the alumina-zirconia ceramic only contains alumina and zirconia, except a stabilizer for zirconia and inevitable impurities described later. The alumina-zirconia ceramic may contain, for example, 60 or more percent by volume of but 80 or less percent by volume of alumina and 40 or less percent by volume of but 20 or more percent of volume of zirconia. This composition ensures the abrasion resistance and the defect resistance suitable for the use as the cutting tool. For example, yttrium oxide ($Y_2O_3$), cerium oxide ($CeO_2$), calcium oxide (CaO) or magnesium oxide (MgO) is available as the stabilizer for zirconia. This embodiment uses zirconia stabilized with 2 to 3 mol $Y_2O_3$%. The content of the inevitable impurities (e.g., $SiO_2$) of the sintered body SC is preferably equal to or less than 0.3 wt % and is more preferably equal to or less than 0.25 wt %. This effectively prevents the inevitable impurities from reducing the cutting performance of the tip 20. Crystal particles of zirconia contained in the sintered body SC are called zirconia crystal particles ZC. Similarly crystal particles of alumina contained in the sintered body SC are called alumina crystal particles AC.

This sintered body SC has first to fourth features described below. The first feature is that the zirconia crystal particles ZC contained in the sintered body SC include tetragonal crystal particles. The second feature is that the zirconia crystal particles ZC and the alumina crystal particles AC contained in the sintered body SC have a predetermined relationship. This second feature is understandable by classifying each zirconia crystal particle ZC into one of three types, based on the positional relationships to the other zirconia crystal particles ZC and the alumina crystal particles AC.

These three types of the zirconia crystal particles ZC are shown in FIG. 2. In FIG. 2, each block represents an individual zirconia crystal particle ZC or alumina crystal particle AC. In order to distinguish between the zirconia crystal particles ZC and the alumina crystal particles AC, blocks representing the alumina crystal particles AC are hatched.

Figure 2A:
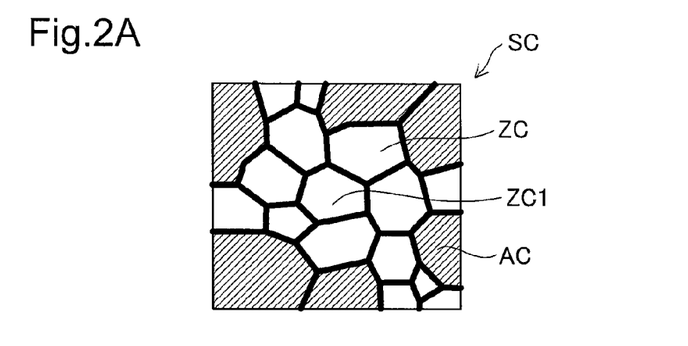
FIG. 2 illustrates types of zirconia crystal particles ZC.

FIG. 2A shows a first zirconia crystal particle ZC1 as a first type. As illustrated in FIG. 2A, the first zirconia crystal particle ZC1 is a zirconia crystal particle surrounded by only the zirconia crystal particles ZC out of the zirconia crystal particles ZC and the alumina crystal particles AC. In other words, the first zirconia crystal particle ZC1 is a zirconia crystal particle having interfaces only with the other zirconia crystal particles ZC.

Figure 2B:
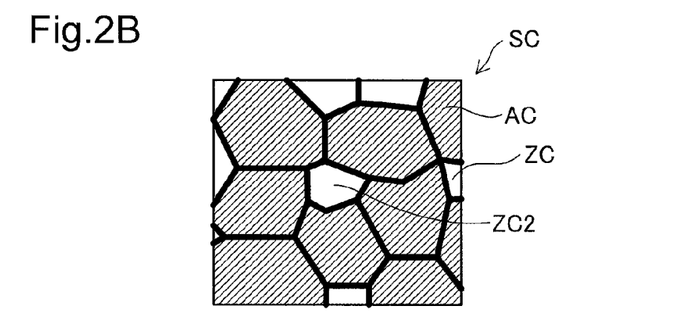

FIG. 2B shows a second zirconia crystal particle ZC2 as a second type. As illustrated in FIG. 2B, the second zirconia crystal ZC2 is a zirconia crystal particle surrounded by only the alumina crystal particles AC.

Figure 2C:
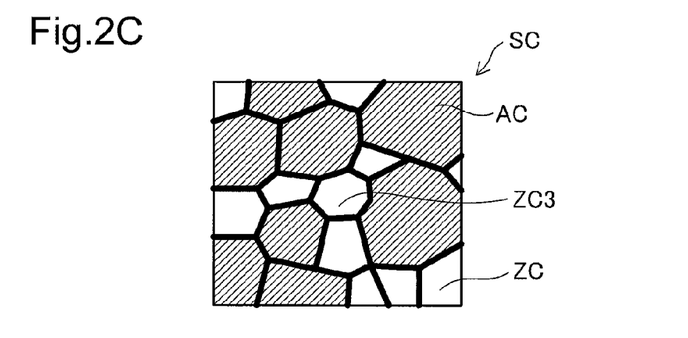

FIG. 2C shows a third zirconia crystal particle ZC3 as a third type. As illustrated in FIG. 2C, the third zirconia crystal ZC3 is a zirconia crystal particle surrounded by both the zirconia crystal particles ZC and the alumina crystal particles AC.

It is assumed herein that the total number of the zirconia crystal particles ZC is expressed by N (where N represents a positive integer) in a 10 μm square area at any cut plane of the sintered body SC. The number of the first zirconia crystal particles ZC1 is expressed by a (where a represents a positive integer smaller than N) out of the N zirconia crystal particles ZC. Similarly the number of the second zirconia crystal particles ZC2 is expressed by b (where b represents a positive integer smaller than N) out of the N zirconia crystal particles ZC. The number of the third zirconia crystal particles ZC3 is expressed by c (where c represents a positive integer smaller than N) out of the N zirconia crystal particles ZC. The values of N and a to c satisfy Equation (1) given below:

$$N = a + b + c \quad (1)$$

The ratio of a to N, i.e., the ratio of the number of the first zirconia crystal particles ZC1 to the total number of all the zirconia crystal particles ZC is expressed by A(=a/N). Similarly the ratio of b to N and the ratio of c to N are respectively expressed by B(=b/N) and C(=c/N).

As the second feature, the sintered body SC of this embodiment simultaneously satisfies the relations of Expressions (2), (3) and (4) given below:

$$0\% \leq A \leq 3\% \quad (2)$$

$$3\% \leq B \leq 22\% \quad (3)$$

$$77\% \leq C \leq 96\% \quad (4)$$

As the third feature, the sintered body SC satisfies Expression (5) given below. In other words, the total number of the zirconia crystal particles ZC is at least 140 in the 10 μm square area at any cut plane of the sintered body SC.

$$N \geq 140 \quad (5)$$

As the fourth feature of the sintered body SC, an average interface length IL satisfies Expression (6) given below, where the average interface length IL means a simple arithmetic average of interface lengths ILm (where m corresponds to the number of arbitrary cut planes), each representing the total length of interfaces between the zirconia crystal particles ZC and the alumina crystal particles AC in the 10 μm square area at each of any five or more cut planes of the sintered body SC. This fourth feature is, however, not essential.

$$IL \geq 180 \ \mu m \quad (6)$$

Figure 3:
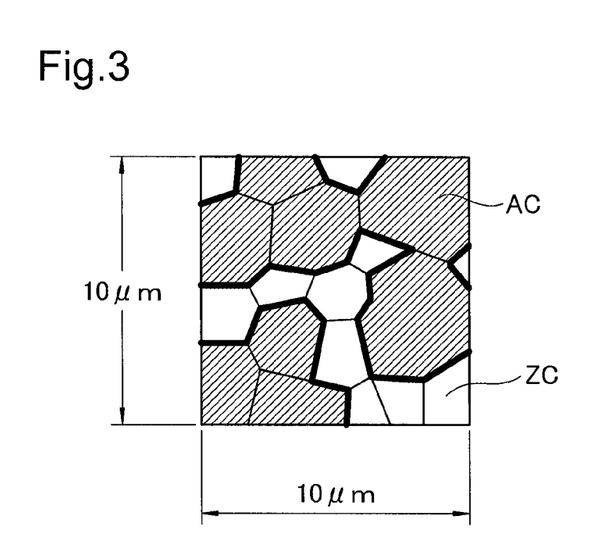
FIG. 3 illustrates interfaces between zirconia crystal particles ZC and alumina crystal particles AC.

The interfaces between the zirconia crystal particles ZC and the alumina crystal particles AC are shown in FIG. 3. FIG. 3 shows a 10 μm square area at a cut plane of the sintered body SC. For convenience of illustration, the illustrated sizes of the individual zirconia crystal particles ZC and alumina crystal particles AC are greater than their actual sizes. In FIG. 3, the interfaces between the zirconia crystal particles ZC and the alumina crystal particles AC are shown by thick lines. The total length of these thick lines is the interface length ILm.

A concrete procedure of checking the above second feature is described. The procedure of checking the second feature sequentially processes the surface of the sintered body SC as a sample by surface grinding, by mirror polishing with diamond slurry and by thermal etching at 1450° C. The procedure subsequently observes the surface of the sample subjected to the thermal etching process with a field emission-scanning electron microscope and obtains an 8000-fold texture image (texture photograph). The procedure then converts the obtained texture image to a grayscale image by imaging processing software (WinROOF manufactured by MITANI CORPORATION). The procedure selects a 10 μm square area located at the approximate center of the converted and displayed image on a display, and respectively counts the total number N of the zirconia crystal particles ZC and the individual numbers a to c of the first to the third zirconia crystal particles ZC1 to ZC3. The procedure accordingly obtains the numbers N and a to c and then calculates the respective ratios A to C from these values.

A concrete procedure of checking the above fourth feature is described with reference to FIG. 4. In a similar manner to the procedure of checking the second feature, the procedure of checking the fourth feature obtains 8000-fold texture images. The procedure of checking the fourth feature obtains five texture images corresponding to five different cut planes of the sintered body SC. The obtained images may be five or more images at respectively different cut planes.

Figure 4A:
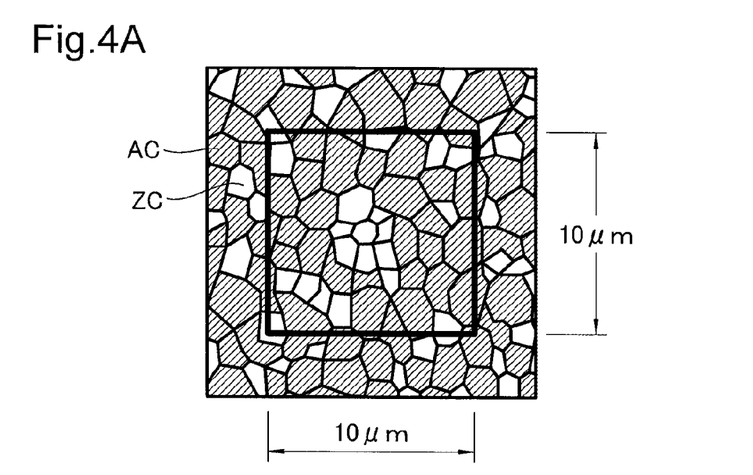
FIG. 4 illustrates a concrete procedure of measuring an average interface length IL.

The procedure subsequently displays one of the obtained texture images on the display by the above image processing software and selects a 10 μm square area located at the approximate center of the displayed image as shown in FIG. 4A. FIG. 4A shows the individual zirconia crystal particles ZC and alumina crystal particles AC in the same manner as FIG. 2. For convenience of illustration, the illustrated sizes of the individual zirconia crystal particles ZC and alumina crystal particles AC are greater than their actual sizes in FIG. 4A.

Figure 4B:
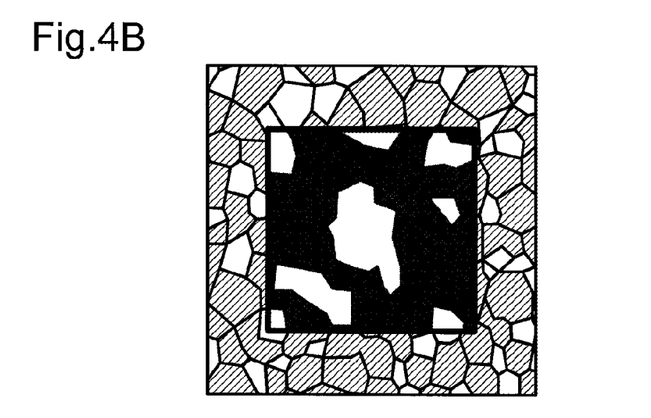

The procedure then converts the image in the selected 10 μm square area to a grayscale image and uses the "brightness/contrast" adjustment function of the image processing software to further change the converted image to a black and white (binarized) image. More specifically, the procedure increases the "contrast" to a value of 100 (maximum value) to highlight black and white in the image and then adjusts the "brightness" to a value of 45 to match the interfaces between white areas and black areas on the image with the actual interfaces of the individual crystal particles. FIG. 4B shows a black and white image in the 10 μm square area. As illustrated, the alumina crystal particles AC and the zirconia crystal particles ZC are respectively displayed in black and in white in a distinctly distinguishable manner.

Figure 4C:
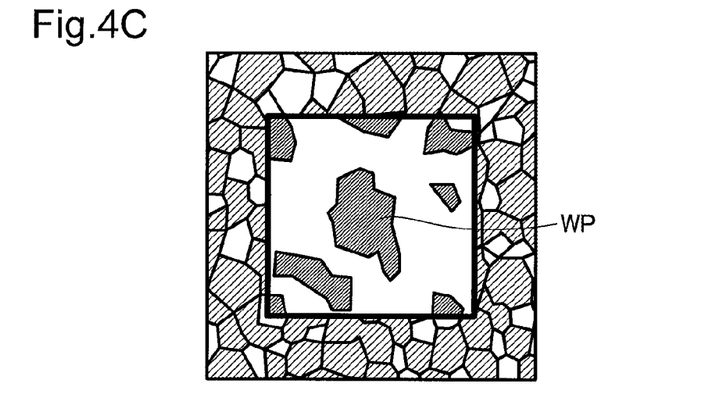

The procedure subsequently uses the "automatic binarization" function of the image processing software to recognize the alumina crystal particles AC as black areas and the zirconia crystal particles ZC as white areas. The procedure then eliminates the potential causes of errors in image processing by "isolated point removal" and subsequent closing (boundary averaging) of this image. The resulting processed image is shown in FIG. 4C. In FIG. 4C, hatched areas represent white areas WP.

The boundary length of the white areas WP in the processed image is measured by the image processing software and is obtained as the interface length ILm. The outer edge of the 10 μm square area, i.e., the line defining the 10 μm square area, is not included in the boundary length. This procedure is repeated with respect to the other four texture images, and the average interface length IL is calculated from the obtained interface lengths ILm (where m represents integers of 1 to 5).

A-2. Manufacturing Method of Tip 20

Figure 5:
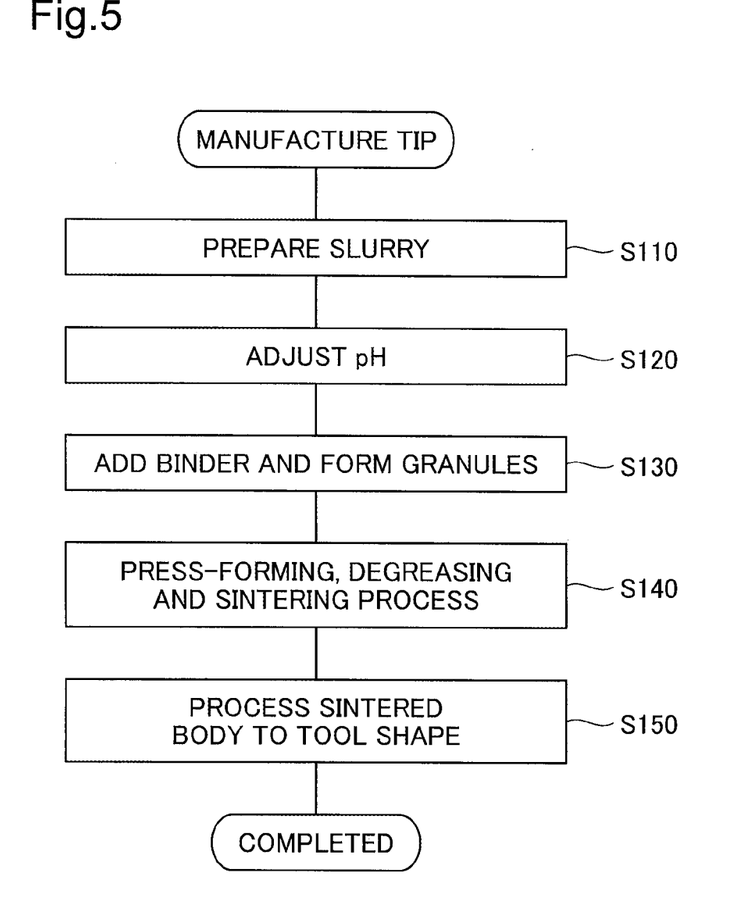
FIG. 5 is a process chart showing a manufacturing process of the tip 20.

A concrete method of manufacturing the above tip 20 is described. FIG. 5 shows a manufacturing process of the tip 20. As illustrated, the manufacturing process of the tip 20 first prepares slurry as the material (Step S110). More specifically, the process blends and pulverizes alumina powder having the mean particle size of 0.6 μm, zirconia powder containing 2 mol % $Y_2O_3$ and having the mean particle size of 0.7 μm with alumina balls and water in an alumina pot for 84 hours to prepare the slurry.

After preparation of the slurry, the process transfers the prepared slurry to an agitated vessel and adjusts pH of the slurry with stirring the slurry with mixing blades (step S120). This pH adjustment aims to control the dispersion/aggregation state of the pulverized particles. The slurry prepared in this embodiment has the pH value of 9. This pH value is close to the isoelectric point (pH 9 to 10) of the zeta potential (surface potential) of alumina and is also close to the isoelectric point (pH 8 to 9) of the zeta potential (surface potential) of zirconia containing 2 mol % $Y_2O_3$. The pH adjustment to pH 8 or lower pH where both alumina and zirconia containing 2 mol % $Y_2O_3$ are positively charged causes electrostatic repulsion to stabilize the dispersion and obtain the desired dispersion state of crystal particles. According to this embodiment, hydrochloric acid (HCl) and aqueous ammonia are used for the pH adjustment and the dispersion/aggregation state control. The dispersion/aggregation state of the pulverized slurry depends on the material and the pulverization condition. The pH value is adjusted according to each combination of different materials and different pulverization conditions, in order to achieve predetermined aggregation/dispersion state. The predetermined aggregation/dispersion state means the state satisfying the condition of Expression (2) given above and keeps the adequate aggregation/dispersion state with avoiding excessive aggregation and fully homogeneous dispersion. The desired dispersion state of crystal particles may be obtained by using a dispersant, instead of the pH adjustment described above. The dispersant used may be, for example, a polycarboxylic acid dispersant such as SN-Dispersant 5027 manufactured by SAN NOPCO LIMITED or a polycarboxylic acid polymer surfactant such as Celuna D735 manufactured by Chukyo Yushi Co., Ltd.

After the pH adjustment, the process adds a binder to the pH-adjusted slurry and forms granules after stirring by spray drying method (Step S130). At this moment, a dispersant may be added according to the state of the slurry. The dispersant may be, for example, ammonium polycarboxylate. The binder may be, for example, a resin material such as polyvinyl alcohol or acrylic resin.

After granulation, the process press-forms, degreases and sinters the spray granules to provide a sintered body SC (step S140). According to this embodiment, the sintering temperature is 1450 to 1550° C. and the sintering time is 2 hours. The resulting primary sintered body is treated by HIP (Hot Isostatic Pressing) in an atmosphere of argon (Ar) gas at 1450° C. and 100 MPa.

After the sintering process, the process polishes and processes the surface of the sintered body SC to a desired tool shape (e.g., SNGN433-TN) (Step S150). This completes the tip 20. The process of steps S110 to S140 may be regarded as the manufacturing method of the sintered body SC.

A-3. Advantageous Effects

The sintered body SC as the material of the tip 20 described above has the condition that the ratio A of the number (a) of the first zirconia crystal particles ZC1 to the total number (N) of the zirconia crystal particles ZC satisfies the relation 0%≤A≤3% in the 10 μm square area at any cut plane. The presence of the zirconia crystal particle ZC surrounded by the zirconia crystal particles ZC enhances the effect of stress-induced transformation and improves the fracture resistance.

The ratio A of greater than 3% accelerates aggregation of the zirconia crystal particles ZC, which may decrease the hardness of the sintered body SC and cause grain coarsening of the zirconia crystal particles ZC, thereby decreasing the wear resistance of the sintered body SC. Controlling the ratio A to or below 3%, however, achieves a balance between the effect of stress-induced transformation and the effect of preventing particle dropout, thus improving the fracture resistance and the wear resistance.

The sintered body SC also has the condition that the ratio B of the number (b) of the second zirconia crystal particles ZC2 to the total number (N) of the zirconia crystal particles ZC satisfies the relation 3%≤B≤22%. The presence of the zirconia crystal particle ZC surrounded by the alumina crystal particles AC prevents aggregation and grain coarsening of the alumina crystal particles AC. Controlling the ratio B to or above 3% prevents aggregation and grain coarsening of the alumina crystal particles AC, thereby improving the wear resistance and the fracture resistance of the sintered body SC. Controlling the ratio B to or below 22%, on the other hand, prevents degradation of the effect of stress-induced transformation and prevents aggregation and grain coarsening of the adjacent alumina crystal particles AC, thereby improving the wear resistance and the fracture resistance of the sintered body SC.

Furthermore, the sintered body SC has the condition that the ratio C of the number (c) of the third zirconia crystal particles ZC3 to the total number (N) of the zirconia crystal particles ZC satisfies the relation 77%≤C≤96%. The presence of both the alumina crystal particles AC and the zirconia crystal particles ZC surrounding a zirconia crystal particle ZC prevents grain coarsening of the respective crystal particles. This also enhances the deflection effect on crack extension, thereby improving the wear resistance and the fracture resistance of the sintered body SC. Controlling the ratio C to or above 77% prevents aggregation or grain coarsening of the alumina crystal particles AC and the zirconia crystal particles ZC, thereby improving the wear resistance and the fracture resistance of the sintered body SC. Controlling the ratio C to or below 96%, on the other hand, prevents the alumina crystal particles AC and the zirconia crystal particles ZC from being in the homogeneously dispersed state. As a result, this prevents degradation of the effects attained by satisfaction of the above conditions 0%≤A≤3% and 3%≤B≤22%.

Additionally, the sintered body SC has the condition that the number of zirconia crystal particles ZC in the 10 μm square area at any cut plane is equal to or greater than 140. This advantageously reduces the sizes of the respective aggregates.

In the sintered body SC satisfying all these conditions, the sizes of the zirconia crystal particles ZC and the alumina crystal particles AC are reduced, and the ratio of the alumina crystal particles AC surrounding a zirconia crystal particle ZC is adequately controlled. This also allows control to prevent the zirconia crystal particles ZC from being excessively concentrated and being unevenly distributed in the sintered body SC. As a result, this achieves the effect of stress-induced transformation and the grain growth-inhibiting effect suitable for the cutting tool. Manufacturing the tip 20 using this sintered body SC advantageously improves the wear resistance and the fracture resistance of the tip 20. The crystalline phase of the zirconia crystal particles ZC is preferably tetragonal. This ensures the sufficient effect of stress-induced transformation. The partial mixture of monoclinic or cubic zirconia crystal particles ZC is, however, not excluded.

Furthermore, the sintered body SC has the condition that the average interface length IL between the zirconia crystal particles ZC and the alumina crystal particles AC is equal to or greater than 180 μm in the 10 μm square area at any five or more cut planes. This allows control to adequately reduce the sizes of the aggregate of the zirconia crystal particles ZC and the aggregate of the alumina crystal particles AC surrounding a zirconia crystal particle ZC and prevent the respective aggregates from being excessively concentrated and being unevenly distributed. As a result, this further improves the wear resistance and the fracture resistance of the sintered body SC.

The sintered body SC is also useful to process steel and ductile cast iron. The sintered body SC has the excellent cutting performance especially in milling process or turning process at a high cutting speed (e.g., 800 m/min).

Controlling the content of $SiO_2$ in the sintered body SC to or below 0.24 wt % advantageously prevents a fracture from arising in the sintered body SC during processing of cast iron including the casting surface.

Figure 6:
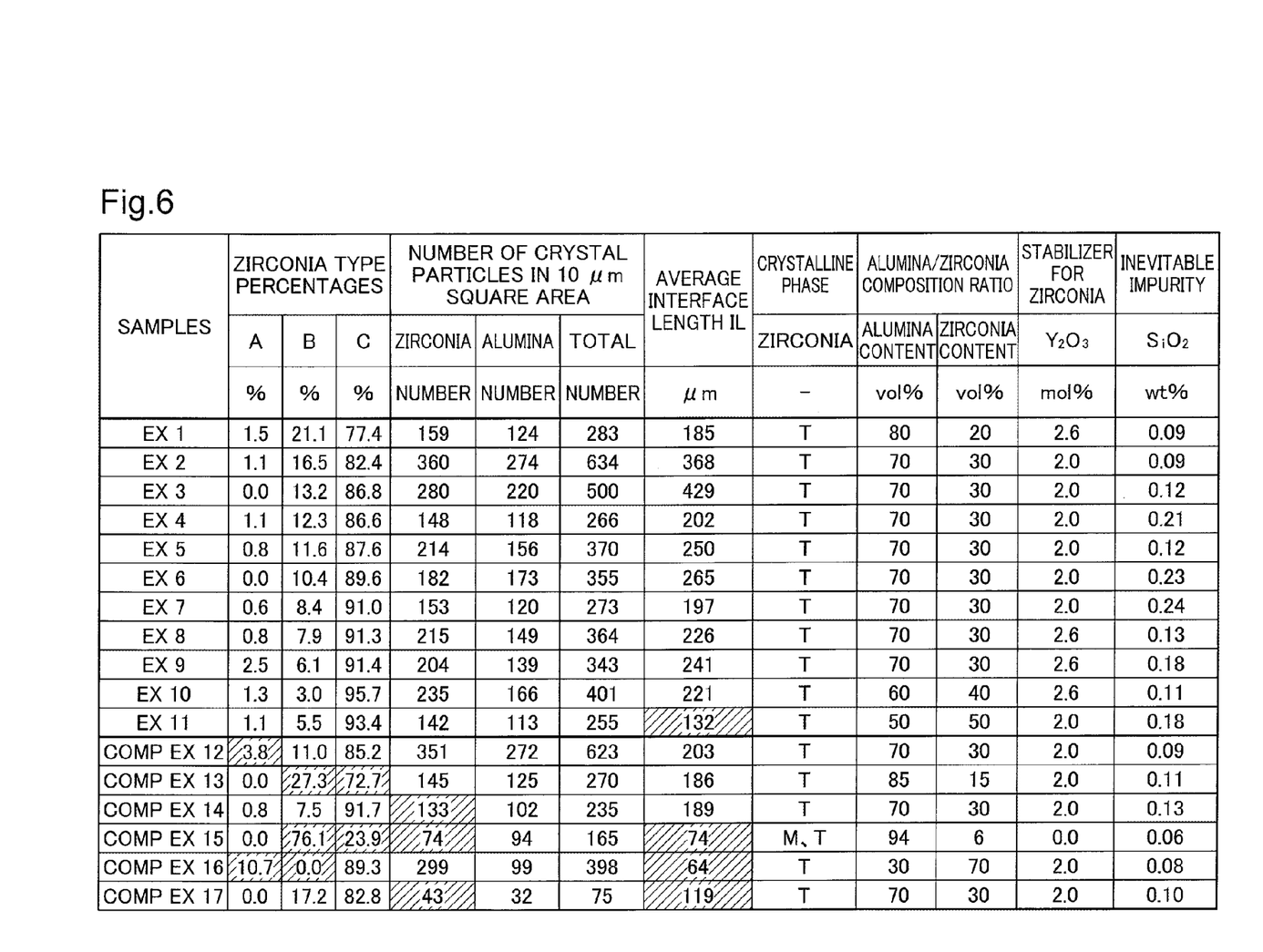
FIG. 6 is a table showing the results of wear resistance test and fracture resistance test performed on the tip 20.
Figure 7:
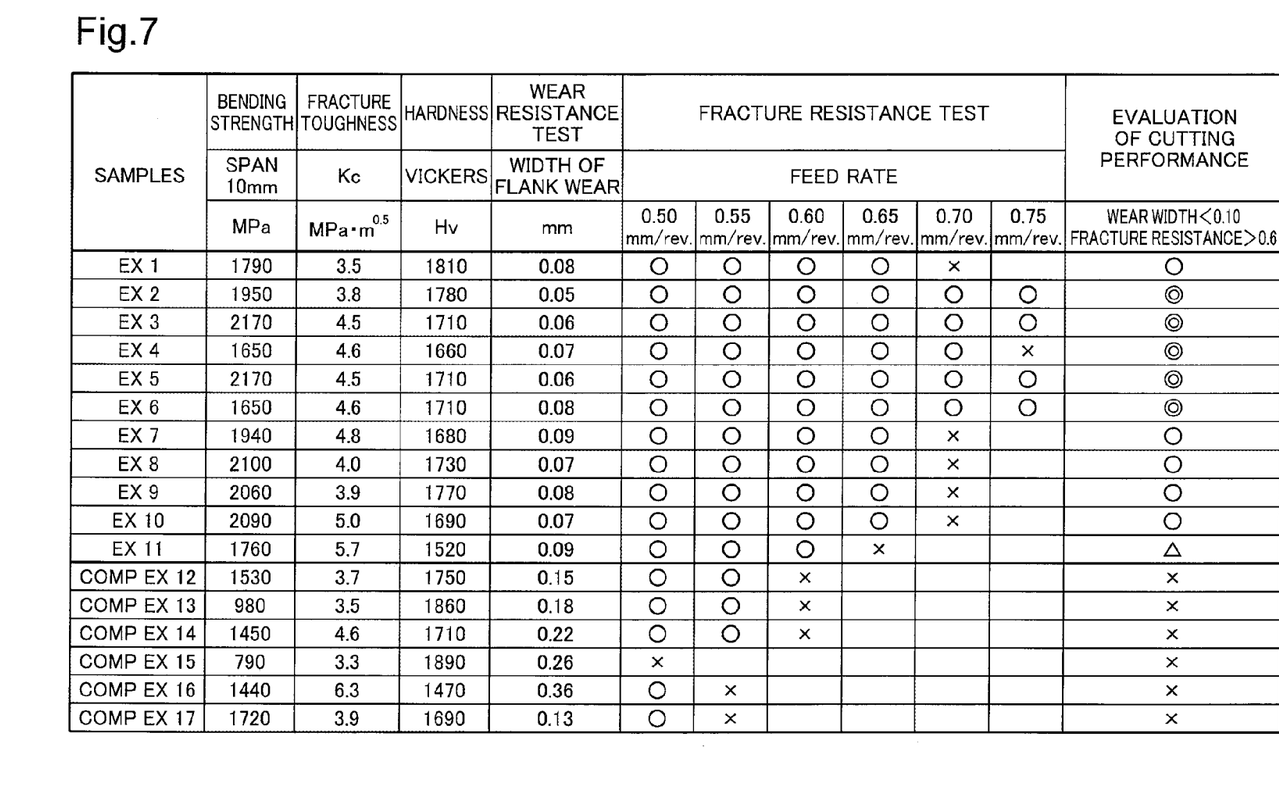
FIG. 7 is a table showing the results of wear resistance test and fracture resistance test performed on the tip 20.

In order to further clarify the advantageous effects described above, FIGS. 6 and 7 show the results of dry cutting tests performed on the tip 20. The cutting tests include an wear resistance test for evaluating the wear resistance and a fracture resistance test for evaluating the fracture resistance. These tests have the following test conditions:

<Wear Resistance Test>
Insert: SNGN432-TN
Work Material: FC300
Cutting Speed: 500 m/min
Cut Depth: 0.3 mm
Feed Rate: 0.3 mm/rev
Evaluation Method Measurement of the width of flank wear after 60 passes <Fracture Resistance Test>
Insert: SNGN432-TN
Work Material: FC200
Cutting Speed: 200 m/min
Cut Depth: 1.5 mm
Feed Rate: 0.50 to 0.75 mm/rev
Evaluation Method Specification of the feed rate on the occurrence of a fracture As shown in FIGS. 6 and 7, the tips 20 using the sintered body SC having the above features were provided as test samples of Examples 1 to 11. Tips using sintered bodies without some of the above features were provided as Comparative Examples 12 to 17.

FIG. 6 shows the measurement results of the respective samples with respect to the zirconia type percentages, the respective numbers of the zirconia crystal particles ZC and the alumina crystal particles AC in a 10 μm square area, the average interface length IL, the crystalline phase, the composition ratio of alumina and zirconia, the content of $Y_2O_3$ as the stabilizer for zirconia and the content of $SiO_2$ as the inevitable impurity. The zirconia type percentages are equal to the measurement results of the ratios A to C described above. The symbol "T" of the crystalline phase represents tetragonal crystal, and the symbol "M" of the crystalline phase represents monoclinic crystal. As shown in FIG. 6, the samples of Examples 1 to 11 have the first to the third features described above. Among the samples of Examples 1 to 11, the samples of Examples 1 to 10 additionally have the fourth feature that is not essential, while the sample of Example 11 does not have the fourth feature. The samples of Comparative Examples 12 to 17 are, on the other hand, lack of at least one of the first to the third features. The hatched values in FIG. 6 show the measurement results having the features different from the first to the fourth features. As shown in FIG. 6, in each of the samples of Examples 1 to 11, the number of alumina crystal particles AC was equal to or greater than 108 in any 10 μm square area.

FIG. 7 shows the results of the wear resistance test and the fracture resistance test of the respective samples and the results of cutting performance evaluation based on these test results. For the purpose of reference, FIG. 7 also shows the measurement results of the bending strength, the fracture toughness and the Vickers hardness. In the fracture resistance test, the result causing a fracture at each feed rate is shown by the "cross mark", while the result causing no fracture at each feed rate is shown by the "circle". According to this embodiment, the cutting performance evaluation determines that each sample satisfying both the conditions that the wear width measured in the wear resistance test is less than 0.10 mm and that no fracture is observed at the feed rate of 0.6 mm/rev in the fracture resistance test, as the sample meeting desired performance criterion. The samples meeting the desired performance criterion are classified into the evaluation levels of "triangle" (allowable), "circle" (good) and "double circle" (very good). The evaluation level of "double circle" is set to each sample having the wear width of less than 0.10 mm and having no fracture at the feed rate of 0.70 mm/rev. The evaluation level of "circle" is set to each sample having the wear width of less than 0.10 mm and having no fracture at the feed rate of 0.65 mm/rev. The evaluation level of "triangle" is set to each sample having the wear width of less than 0.10 mm and having no fracture at the feed rate of 0.6 mm/rev. The evaluation level of "cross-mark" (poor) is set to each sample that does not meet the performance criterion.

As shown in FIG. 7, the samples of Examples 2 to 6 had the evaluation level of "double circle". The samples of Examples 1 and 7 to 10 had the evaluation level of "circle". The sample of Example 11 had the evaluation level of "triangle". The samples of Comparative Examples 12 to 17, on the other hand, had the evaluation level of "cross-mark". In the wear resistance test, the samples of Examples 1 to 11 had the wear widths of approximately half or one third of the wear widths of Comparative Examples 12 to 17 and were thus evaluated to have the excellent wear resistance. In the fracture resistance test, the samples of Examples 1 to 11 had no fracture at the higher feed rates than the feed rates of Comparative Examples 12 to 17 and were thus evaluated to have the excellent fracture resistance. As described above, using the sintered body SC of the embodiment provides the alumina-zirconia tip 20 having the long life and allowing the highly efficient processing.

According to the results of the cutting performance evaluation on Examples 1 to 11 or more specifically according to the difference between the evaluation levels of "circle" and "double circle", the ratio A preferably satisfies the relation 0%≤A≤2%, the ratio B preferably satisfies the relation 9%≤B≤20%, and the ratio C preferably satisfies the relation 82%≤C≤90%.

Similarly according to the difference between the evaluation levels of "circle" and "double circle", the number of the alumina crystal particles AC in the 10 μm square area is preferably equal to or greater than 110. The total number of the zirconia crystal particles ZC and the alumina crystal particles AC is preferably equal to or greater than 250. The average interface length IL is preferably equal to or greater than 200 μm. The fourth feature described above (IL≥180 μm) causes the difference between the evaluation levels of "circle" and "triangle".

According to the difference between the evaluation levels of "circle" and "double circle" and the results of the fracture resistance test on Examples 1 to 11 or more specifically by taking into account the difference between the case with no fracture and the case with a fracture at the feed rate of 0.75 mm/rev, the total number of the zirconia crystal particles ZC in the 10 μm square area is preferably equal to or greater than 180. The number of the alumina crystal particles AC in the 10 μm square area is preferably equal to or greater than 150. The total number of the zirconia crystal particles ZC and the alumina crystal particles AC in the 10 μm square area is preferably equal to or greater than 330. The average interface length IL is preferably equal to or greater than 250 μm.

According to the results of the wear resistance test on Examples 1 to 11 in addition to the difference between the evaluation levels of "circle" and "double circle" and the results of the fracture resistance test or more specifically by taking into account the difference between the case having the wear width of or below 0.06 mm and the case having the wear width of or above 0.07 mm, the total number of the zirconia crystal particles ZC in the 10 μm square area is preferably equal to or greater than 210. The number of the alumina crystal particles AC in the 10 μm square area is preferably equal to or greater than 150. The total number of the zirconia crystal particles ZC and the alumina crystal particles AC in the 10 μm square area is preferably equal to or greater than 360. The average interface length IL is preferably equal to or greater than 250 μm.

Figure 8:
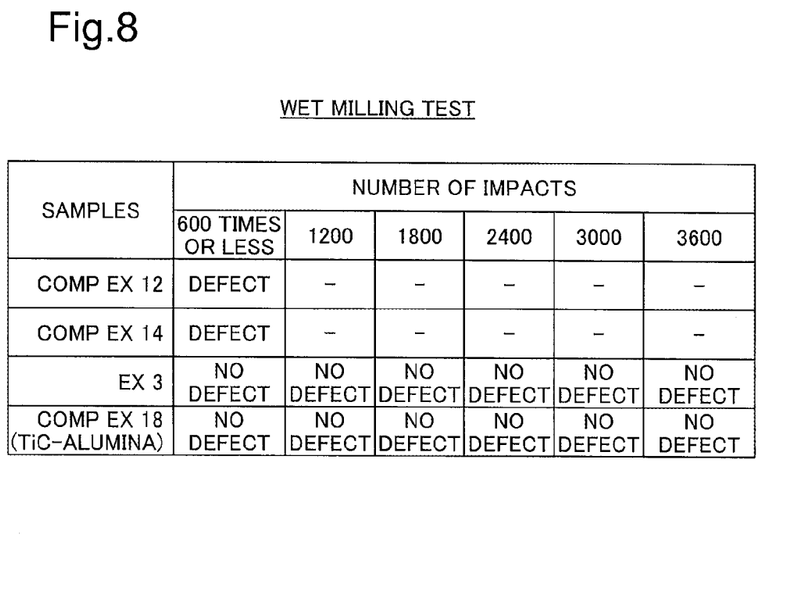
FIG. 8 is a table showing the results of wet milling test performed on the tip 20.

FIG. 8 shows the results of wet milling test performed on the tip 20. The sample of Example 3 and the samples of the Comparative Examples 12 and 14 shown in FIGS. 6 and 7 and a commercially available titanium carbide (TiC)-alumina tool (HC2 manufactured by NGK Spark Plug Co., Ltd.) as Comparative Example 18 were subjected to this test. This test has the following test conditions:

<Wet Milling Test>
   Insert: SNGN432-TN
   Work Material: FC300
   Cutting Speed: 600 m/min
   Cut Depth: 1.0 mm
   Feed Rate: 0.1 mm/rev
   Evaluation Method Specification of the number of passes on the occurrence of a heat fracture Comparative Examples 12 and 14 have textures where the zirconia particles are not aggregated but are homogeneously dispersed in alumina. As shown in FIG. 8, the samples of Comparative Examples 12 and 14 had heat fracture arising at the number of impacts (number of passes) of or below 600 times. Examples 3 and 18, on the other hand, had no heat fracture even at the number of impacts of 3600 times. As described above, the tip 20 of the embodiment was evaluated to have the excellent thermal shock resistance equivalent to that of the alumina-TiC tool (Comparative Example 18). The cutting tools of the conventional alumina-zirconia ceramics tend to have heat fracture in wet milling process and are thus not readily applicable to wet milling process. The tip 20 of the embodiment can be, on the other hand, suitably used for wet milling process.

Figure 9:
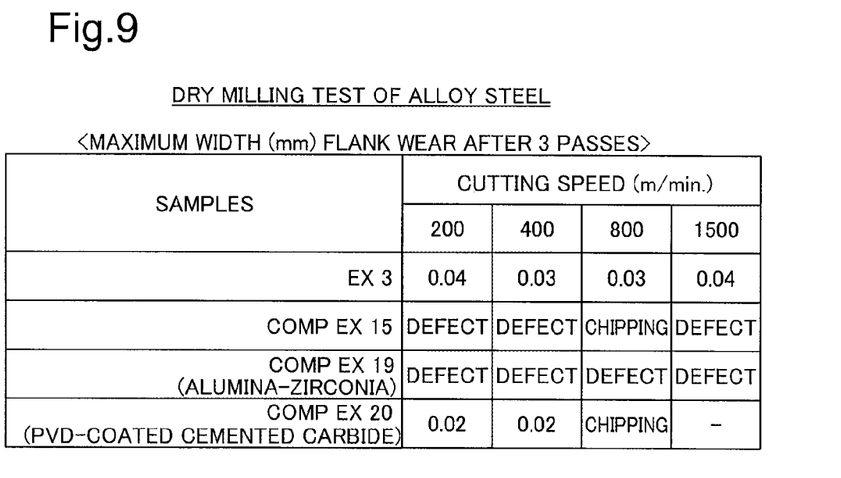
FIG. 9 is a table showing the result of dry milling test performed on a second tip.

FIG. 9 shows the results of dry milling test (wear resistance test) performed on a second tip different from the tip 20. The second tip used for this test has a different insert from that of the tip 20 but uses the sintered body identical with the sintered body SC of the tip 20 as the material. The material used for this test is alloy steel (chromium molybdenum steel). This test has the following test conditions:

<Dry Milling Test>
   Insert: SEKN1203AF
   Work Material: SCM415
   Cutting Speed: 200 to 1500 m/min
   Cut Depth: 1.0 mm Feed Rate: 0.10 mm/rev
Coolant: Not Used (Dry)
Evaluation Method Maximum width of peripheral wear after three passes As shown in FIG. 9, the total of four samples, Example 3, Comparative Example 15, Comparative Example 19 and Comparative Example 20 were subjected to this test. The sample of Example 3 and the sample of Comparative Example 15 are respectively identical with the sample of Example 3 and the sample of Comparative Example 15 shown in FIGS. 6 and 7. The sample of Comparative Example 19 is a commercially available alumina-zirconia tool (HC1 manufactured by NGK Spark Plug Co., Ltd.) and the sample of Comparative Example 20 is a commercially available PVD-coated carbide tool (PR905 manufactured by Kyocera Corporation). This test evaluated each sample by processing the sample at four different cutting speeds.

As shown in FIG. 9, Comparative Example 15 and Comparative Example 19 had a fracture or chipping arising at any cutting speed from the minimum speed (200 m/min) to the maximum speed (1500 m/min). Comparative Example 20 had no fracture or chipping arising at the relatively low cutting speeds (200 and 400 m/min) and allowed normal processing with relatively small wear widths, while having chipping arising at the relatively high cutting speed (800 m/min). Comparative Example 20 caused extreme abrasion with peel-off of the PVD coat and the resulting exposure of the underlying cemented carbide at the cutting speed of 1500 m/min, and the test was not continuable.

Compared with these Comparative Examples 15, 18 and 19, the wear widths of Example 3 at the relatively low cutting speeds (200 and 400 m/min) were comparable to those of Comparative Example 20. Additionally, even at the relatively high cutting speeds (800 and 1500 m/min), Example 3 had no chipping or fracture and had the wear widths comparable to those at the relatively low cutting speeds (200 and 400 m/min). As described above, the second tip of this embodiment using the alloy steel as the material has the high wear resistance in the dry milling process. According to the test results of FIG. 7, it is estimated that the test using any of the samples of Examples 2 and 4 to 6 instead of the sample of Example 3 may give similar results. This test used chromium molybdenum steel as the material, but it is estimated that the test using any alloy steel (steel containing one or more alloy elements) instead of the chromium molybdenum steel may give similar results. It is also estimated that the test using any steel such as carbon steel, stainless steel or heat-resistant steel instead of the alloy steel may give similar results.

Figure 10:
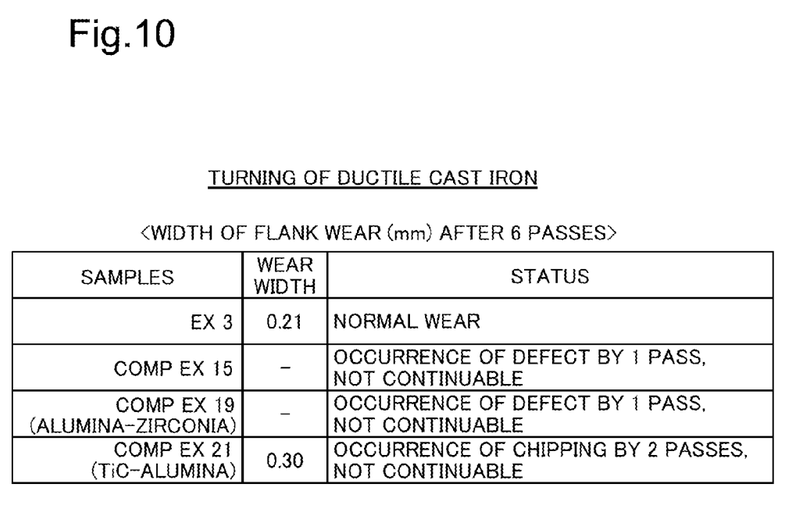
FIG. 10 is a table showing the results of turning performed on a third tip.

FIG. 10 shows the results of turing (wear resistance test) performed on a third tip different from the tip 20. The third tip used for this test has a different insert from that of the tip 20 but uses the sintered body identical with the sintered body SC of the tip 20 as the material. The material used for this test is ductile cast iron. This test has the following test conditions. As shown in the following conditions, the cutting speed of this test was relatively high speed (800 m/min).
<Turning>
 Insert: SNGN120412T01020
 Work Material: FC600
 Cutting Speed: 800 m/min
 Cut Depth: 1.0 mm
 Feed Rate: 0.10 mm/rev
 Coolant: Used
 Evaluation Method Width of flank wear after six passes As shown in FIG. 10, the total of four samples, Example 3, Comparative Example 15, Comparative Example 19 and Comparative Example 21 were subjected to this test. The sample of Example 3 and the sample of Comparative Example 15 are respectively identical with the sample of Example 3 and the sample of Comparative Example 15 shown in FIGS. 6 and 7. The sample of Comparative Example 19 is a commercially available alumina-zirconia tool (HC1 manufactured by NGK Spark Plug Co., Ltd.) like the sample of Comparative Example 19 shown in FIG. 9, and the sample of Comparative Example 21 is a commercially available TiC-alumina tool (HC6 manufactured by NGK Spark Plug Co., Ltd).

As shown in FIG. 10, Comparative Examples 15 and 19 had fractures caused by the processing of only one pass, and the test was not continuable. Comparative Example 21 had chipping caused by the processing of only two passes, and the test was not continuable. The wear width at this moment was 0.3 mm. Compared with these Comparative Examples 15, 19 and 21, Example 3 allowed normal processing of six passes, and the wear width was 0.21 mm. As described above, the third tip of this embodiment using the ductile cast iron as the material has the high wear resistance in the high-speed turning process. According to the test results of FIG. 7, it is estimated that the test using any of the samples of Examples 2 and 4 to 6 instead of the sample of Example 3 may give similar results.

Based on the above two test results, the second tip and the third tip of this embodiment are preferably used to process alloy steel or ductile cast iron. There has been a demand for using alloy steel or ductile cast iron, with the purpose of weight reduction and strength improvement of various products. These materials, however, have the high hardness and the high toughness, so that tools using the conventional alumina-zirconia ceramics are not usable as the tool for cutting and processing these materials and the available tools for such processing are limited to only specific tools such as PVD-coated cemented carbide tools. Even the tool adoptable for cutting and processing the alloy steel or the ductile cast iron causes a fracture or chipping in the cutting process at a very high speed (for example, 800 m/min or higher speed) and can thus not be used for cutting and processing at the very high speed. The second tip and the third tip of the embodiment can be, on the other hand, used for high-speed cutting and processing of the alloy steel or the ductile cast iron and can thus process there materials with high efficiency. The shape of the tip used for the high-speed cutting and processing of the alloy steel or the ductile cast iron is preferably a positive shape having the relief angle of 3 to 30 degrees relative to the major cutting edge.

Figure 11:
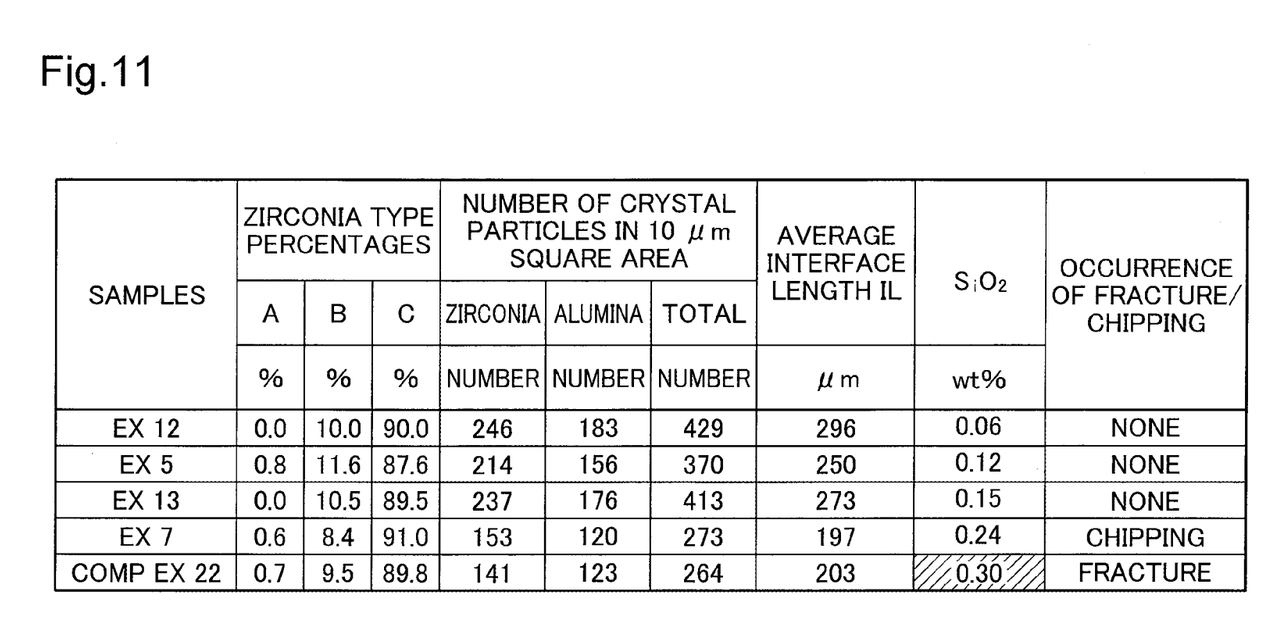
FIG. 11 is a table showing the results of first turing performed on the tip 20.

FIG. 11 shows the result of first turning (fracture resistance test) performed on the tip 20. The material used for this test has partial exposure of the casting surface unlike the material used for the fracture resistance test and the wear resistance test of FIGS. 6 and 7. This test has the following test conditions:
<Turning>
 Insert: SNGN432-TN
 Work Material: FC300 (partial exposure of casting surface)
 Cutting Speed: 500 m/min
 Cut Depth: 0.4 mm
 Feed Rate: 0.4 mm/rev
 Coolant: Not Used (Dry)
 Evaluation Method Occurrence of fracture or chipping after processing of five passes This test aims to evaluate the effect of the content of $SiO_2$ (wt %) contained in the tip 20 (sintered body SC) on the fracture resistance. The respective samples have different contents of $SiO_2$ (wt %). The content of $SiO_2$ may be controlled by regulating the amount of $SiO_2$ added to the slurry at step S110 of FIG. 5.

As shown in FIG. 11, the total of five samples, Example 12, Example 5, Example 13, Example 7 and Comparative Example 22 were subject to this test. The samples of Example 5 and Example 7 are respectively identical with the samples of Example 5 and Example 7 shown in FIGS. 6 and 7. The samples of Examples 12 and 13 have all the first to the fourth features described above. The content of $SiO_2$ in the sample of Example 12 is 0.06 wt %, and the content of $SiO_2$ in the sample of Example 13 is 0.15 wt %. The sample of Comparative Example 22 has all the first to the fourth features described above. The content of $SiO_2$ in the sample of Comparative Example 22 is, however, 0.30 wt %, which is significantly higher than the other samples. The content of $SiO_2$ contained in each sample may be measured by, for example, fluorescent X-ray analysis. In any of the samples shown in FIG. 11, the number of alumina particles in the 10 μm square area was equal to or greater than 120.

As shown in FIG. 11, Examples 12, 5 and 13 had no chipping or fracture. Example 7 had chipping. Comparative Example 22 had a fracture. According to the results of this test, the relatively small content of $SiO_2$ caused no chipping or fracture. Additionally, according to the results of this test, the content of $SiO_2$ of or below 0.24 wt % prevented the occurrence of at least a fracture. Preventing the occurrence of chipping or fracture by the relatively small content of $SiO_2$ may be attributed to the following reason. $SiO_2$ contained in the sintered body SC tends to readily react with Si and Mn as the texture control components of cast iron as the material and with Ca derived from the casting mold (casting sand) and included in the casting surface under the high-temperature condition, such as during the cutting process. The reactions of $SiO_2$ in the sintered body SC with these components accelerate softening of the grain boundary phase mainly consisting of $SiO_2$ in the sintered body SC and deposition of Mn, Si and Ca onto the surface of the sintered body SC (tip 20). Controlling the content of $SiO_2$ in the sintered body SC to a relatively low level accordingly suppresses the reaction-induced softening of the grain boundary phase mainly consisting of $SiO_2$ in the sintered body SC and becomes less likely to cause chipping or fracture. Such control also suppresses the reaction-induced deposition of Mn, Si and Ca onto the surface of the sintered body SC (tip 20) and becomes less likely to cause chipping or fracture accompanied with the peel-off of the deposition by the impact during the processing.

Figure 12:
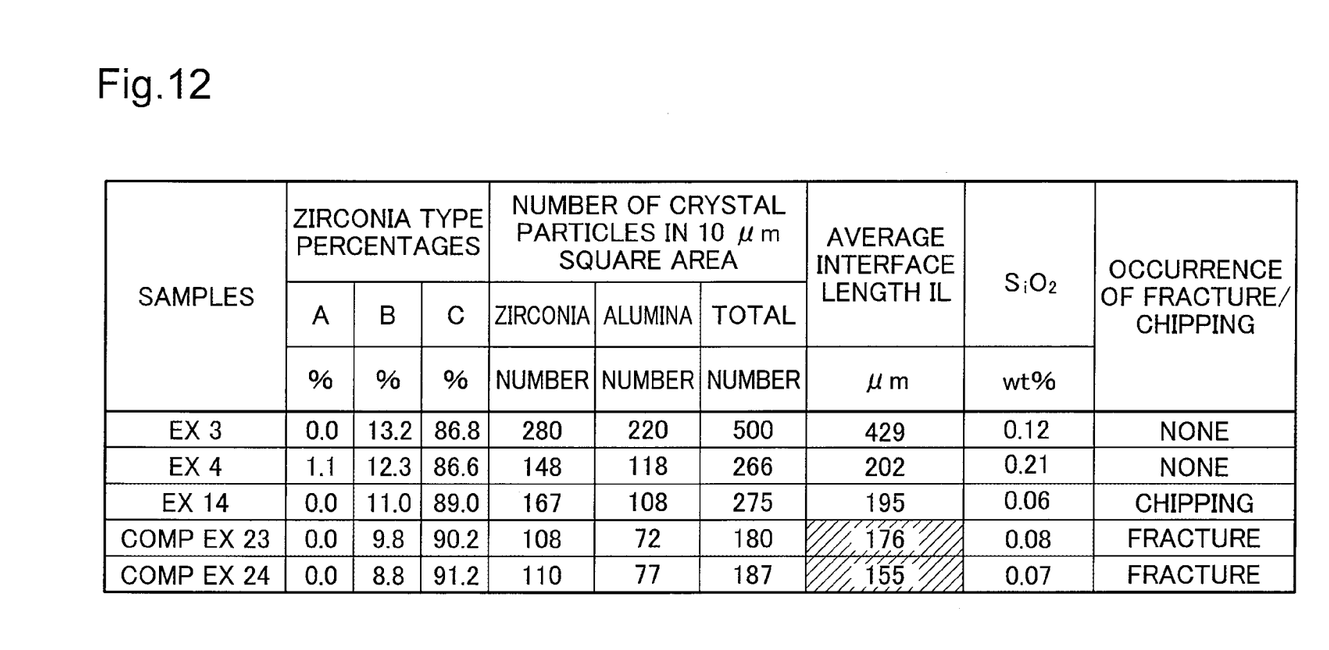
FIG. 12 is a table showing the results of second turning performed on the tip 20.

FIG. 12 shows the results of second turning (fracture resistance test) performed on the tip 20. The material used for this test has partial exposure of the casting surface unlike the material used for the fracture resistance test and the wear resistance test of FIGS. 6 and 7. The test conditions of this test are identical with the above test conditions of the first turning performed on the tip 20.

This test aims to evaluate the effect of the average interface length IL of the tip 20 (sintered body SC) on the wear resistance. The respective samples have different average interface lengths IL. The average interface length IL may be controlled by regulating the sintering temperature and the retention time (press-forming, degreasing and sintering processes) of step S140 in FIG. 5. More specifically, the higher sintering temperature or the longer retention time causes the shorter average interface length IL. The average interface length IL may also be controlled by regulating the mixing time at step S110 in FIG. 5. More specifically, the longer mixing time causes the longer average interface length IL.

As shown in FIG. 12, the total of five samples, Example 3, Example 4, Example 14, Comparative Example 23 and Comparative Example 24 were subjected to this test. The samples of Example 3 and Example 4 are respectively identical with the samples of Example 3 and Example 4 shown in FIGS. 6 and 7. The sample of Example 14 has all the first to the fourth features described above. The average interface length IL of Example 14 is 195 μm. Both the samples of Comparative Examples 23 and 24 have the first to the third features described above. The samples of Comparative Examples 23 and 24, however, do not have the fourth feature (IL≥180 μm) described above. More specifically, the average interface length IL of the sample of Comparative Example 23 is 176 μm, and the average interface length IL of the sample of Comparative Example 24 is 155 μm.

As shown in FIG. 12, the samples having the relatively long average interface lengths IL (202 μm or longer) (Examples 3 and 4) had no chipping or fracture. Example 14 had chipping. Both Comparative Examples 23 and 24 had fractures. According to the results of this test, no chipping or fracture arose in the case of relatively short average interface length IL. Additionally, according to the results of this test, the average interface length IL of or above 195 μm prevented the occurrence of at least a fracture. Preventing the occurrence of chipping or fracture by setting the relatively long average interface length IL may be attributed to the presumption that the longer average interface length IL causes the stronger binding force between the alumina crystal particles and the zirconia crystal particles. In the respective samples of Examples 3, 4 and 15 with no fracture, the number of alumina particles in the 10 μm square area was equal to or greater than 108.

The foregoing describes some embodiments of the invention. The invention is, however, not limited to the above embodiments but various modifications and variations may be made to these embodiments without departing from the scope of the invention. For example, the elements of the examples corresponding to the components of the respective aspects described above may be adequately combined, omitted or conceptualized in embodiments that solve at least part of the problem described above or in embodiments that achieve at least part of the advantageous effects described above. The sintered body of the invention is applicable to cutting tools of various shapes used for various works, such as turning process, milling process and groove forming process. The sintered body of the invention may also be used to process various steels and ductile cast iron.

REFERENCE SIGNS LIST

20 Tip
SC Sintered body
ZC Zirconia crystal particles
AC Alumina crystal particles
IL Average interface length
WP White areas
ZC1 First zirconia crystal particles
ZC2 Second zirconia crystal particles
ZC3 Third zirconia crystal particles

The invention claimed is:
1. A sintered body containing alumina crystal particles and zirconia crystal particles as main components, wherein
the zirconia crystal particles include tetragonal crystal particles and satisfy relations 0%≤A≤3%, 3%≤B≤22% and 77%≤C≤96%, wherein

N represents a total number of the zirconia crystal particles in a 10 μm square area at any cut plane of the sintered body, A represents a ratio of a number a of first zirconia crystal particles to the total number N of the zirconia crystal particles, wherein each of the first zirconia crystal particles is surrounded by only the zirconia crystal particles, B represents a ratio of a number b of second zirconia crystal particles to the total number N of the zirconia crystal particles, wherein each of the second zirconia crystal particles is surrounded by only the alumina crystal particles, and C represents a ratio of a number c of third zirconia crystal particles to the total number N of the zirconia crystal particles, wherein each of the third zirconia crystal particles is surrounded by both the zirconia crystal particle and the alumina crystal particle, and the number N is equal to or greater than a value 140.

2. The sintered body according to claim 1, wherein an average total length of interfaces between the zirconia crystal particles and the alumina crystal particles is equal to or greater than 180 μm in a 10 μm square area at each of any five or more cut planes of the sintered body.

3. The sintered body according to claim 1 wherein a content of $SiO_2$ contained in the sintered body is equal to or less than 0.24 wt %.

4. A cutting tool using the sintered body according to claim 1.

5. The cutting tool according to claim 4, wherein
the cutting tool being used to process steel.

6. The cutting tool according to claim 4, wherein
the cutting tool being used to process ductile cast iron.

* * * * *